United States Patent

[11] 3,607,690

| [72] | Inventor | John Weber Brant<br>1780 B Devers Road, Colony Park Apts.,<br>York, Pa. 17404 |
| --- | --- | --- |
| [21] | Appl. No. | 722,083 |
| [22] | Filed | Apr. 17, 1968 |
| [45] | Patented | Sept. 21, 1971 |

[54] AIR-WATER DEPOLLUTION SYSTEMS
8 Claims, 8 Drawing Figs.

[52] U.S. Cl. ........................................ 204/151,
204/158
[51] Int. Cl. ........................................ C02b 1/82,
C02b 1/00
[50] Field of Search ........................... 55/68, 73,
84, 95; 204/149, 151, 158, 180 P

[56] References Cited
UNITED STATES PATENTS

| 937,147 | 10/1909 | Eschellmann et al. | 55/73 |
| 1,840,105 | 1/1932 | Kean | 204/151 |
| 1,971,855 | 8/1934 | Heimrod | 23/178 |
| 2,028,336 | 1/1936 | Kuhl | 23/2 |
| 2,033,933 | 3/1936 | Goodwin et al. | 23/2 |
| 2,199,691 | 5/1940 | Carter | 55/73 |
| 2,259,046 | 10/1941 | Roberts | 204/151 |

*Primary Examiner*—Howard S. Williams
*Assistant Examiner*—A. C. Prescott
*Attorney*—Woodcock, Washburn, Kurtz & Mackiewicz ABSTRACT: An air-water depollution system is described. The system includes a number of subsystems which precipitate particulates from gaseous emissions, cool the emission, and mix it with cold water to form an electrolyte for subsequent electrochemical and/or oxidative use. The electrolyte source may be mixed with waste water and the resulting mixture processed in an electrochemical processing unit which produces a cleansed effluent ready for reuse.

AIR-WATER DEPOLLUTION SYSTEMS

BACKGROUND OF THE INVENTION of the Invention

This invention relates to air-water depollution and, more particularly, to a system (a) to rid both particulate and gaseous matters from emissions emanating as a result of the combustion of fossil fuels for heat or power generation, and (b) to rid industrial waste or municipal sewage waters, physically of all solid wastes, then electrochemically of soluble inorganic and colloidal organic matters.

Prior art air depollution particulate collecting devices generally emphasize mechanical design rather than the application of physical and chemical principles. One of the more advanced types of particulate collecting devices is referred to as a "wet collector." These are described in an article titled "All About Wet Collectors" by Lewis Dickey, Air Engineering, Jan. 1967. U.S. Pat. No. 3,332,214 to Huppke describes one type of prior art particulate collector.

Water depolluting devices are somewhat more effective but the present state of the art leaves much to be desired in the removal of dissolved or soluble inorganic and organic matter and in removing colloidal matter. This necessitates secondary and even tertiary treatment which still leaves behind objectionable traces of ions, salts or organisms. The general state of the art of water depollution is summarized in a waste treatment process chart published by Scranton Publishing Company, New York, New York, in Water And Wastes Digest.

The removal of objectionable gases from an emission has been a long-standing problem. One example of a prior art technique for treating waste gases is described in Kemmetmuller U.S. Pat. No. 3,224,841 which describes cooling of the gases.

Electrochemical treatment of waste water has been used for a number of years. However, as noted in Electrochemical Treatment of Municipal Waste Water, AWTR-13, U.S. Department of Health, Education and Welfare, by H. C. Miller and W. Knipe, state of the art electrochemical treatment methods are not considered economically practical for waste water renovation. Typical systems for electrochemical galvanic processing of water are shown in U.S. Pat. Nos. 2,762,770, to Widmer et al.; 3,236,757 to Lit; and 3,035,992 to Hougen.

SUMMARY OF THE INVENTION

The primary purpose of the present invention is to cleanse an emission stream, which is typically otherwise exhausted by a stack, of particulates and component gases. The present invention includes several subsystems which are interconnected to accomplish this in an economical manner. To enhance the economics of the overall system, provision is made for introducing and additionally treating industrial or sanitary waste waters, using for this secondary purpose the effluent from the subsystems which cleanse the emission stream.

In the subsystems of the present invention the emission stream is centrifuged as it is forced through an ascending spiraling duct having perforations therein. Some particulate matter is removed centripetally from the emission stream in this manner. The emission is drawn through a dense magnetic field to further cleanse it of particulate matters. The volume of the emission gas is then reduced by cryogenic cooling which also increases the solubilities of gaseous contaminants of the emission stream. Next, the gaseous contaminants are dissolved in cold, deionized water. While this reaction finally cleanses the gaseous emission stream, the reaction is also accomplished in the presence of a catalyst which enhances the production of an electrolyte source for subsequent electrochemical and/or oxidative use. In order to fully realize the economics of the system of this invention, next, industrial waste water or municipal sewage water can be introduced and mixed with the electrolyte source. Centrifugation will remove all solid wastes from this effluent stream. The only contaminants remaining in this effluent stream then are organic and nonorganic contaminants in colloidal suspension or ionic form. The ratio of organic matter to electrolyte source is programmed, hence carefully controlled. Finally, the colloidal and soluble inorganic and organic matter is electrochemically oxidized in a programmed electrochemical processor which utilized the Donnan Equilibrium Principle. A relatively clean effluent ready for reuse is produced.

Accordingly, it is an object of the present invention to provide an improved system for removing particulates from an emission stream which would otherwise be typically exhausted via a stack.

It is another object of the present invention to provide an optional subsystem which contains superconducting magnets that act to magnetically precipitate particles.

It is another object of the present invention to substantially reduce the volume of the emission stream and at the same time increase solvation and the solubilities of objectionable gases contained in the emission stream by cryogenic cooling.

It is another object of the present invention to provide a system in which the processed or conditioned emission stream is mixed with deionized water to dissolve the gases, change their state from gas to liquid and thereby reduce the emission steam to an effluent.

It is another object of the present invention to treat the effluent stream physically to separate physically miscible and immiscible fractions and to remove the immiscible fractions and suspended matter.

It is another object of the present invention to provide an electrochemical processing unit including rechargeable organic electrodes and in which the migration and concentration of inorganic ions in the effluent can be carefully controlled.

The foregoing and other objects, features and advantages of the present invention will be better understood from the following more detailed description and claims in conjunction with the drawings.

DESCRIPTION OF A PARTICULAR EMBODIMENT

Figure 1:
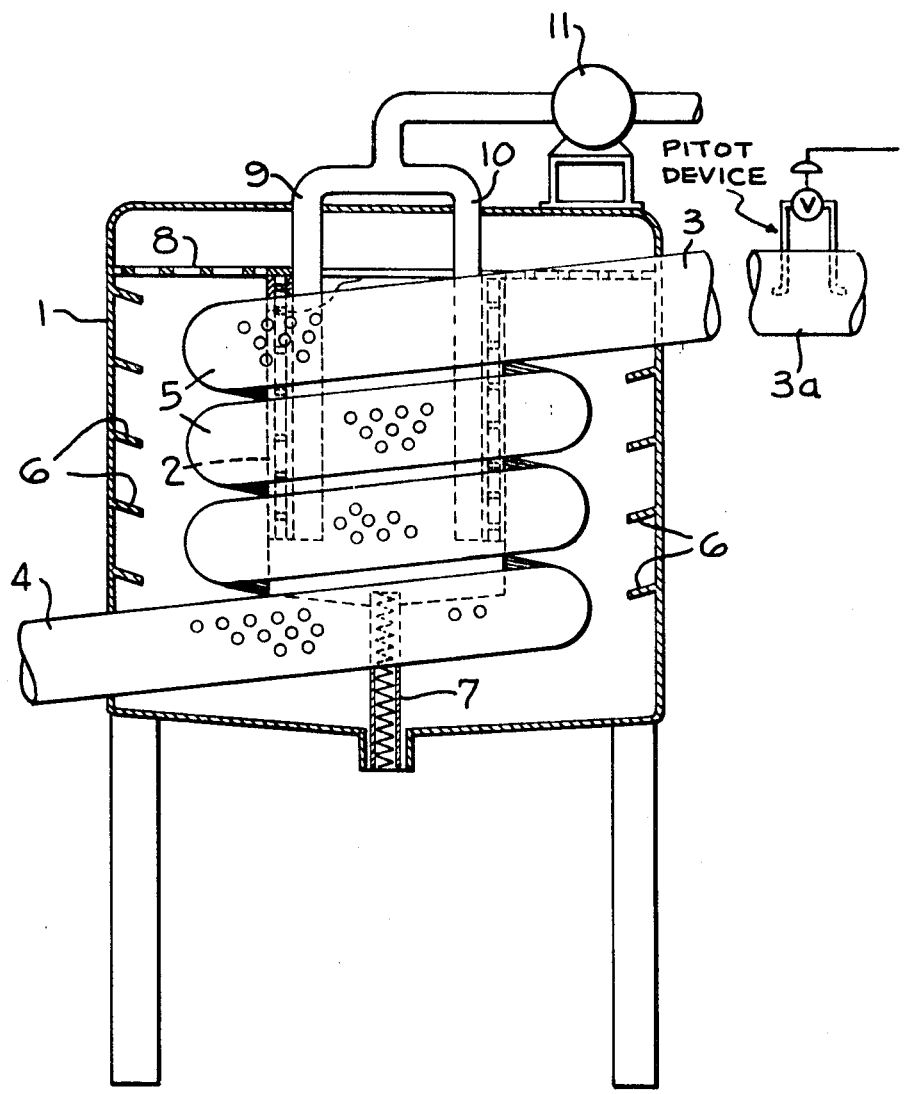
FIG. 1 shows the centripetal fly ash/dust collector.

Referring now to FIG. 1, the centripetal fly ash/dust collector includes a first, generally closed, container or tank 1. The container 1 is generally closed in that the only openings are those through which ducts or pipes extend. A second container 2 is positioned within the first container. A vertically spiraling duct 3 is coiled around the second container. The emission stream is blown into the duct at the bottom end 4. The duct 3 is perforated semicircumferentially as in the perforations 5. The duct 3 encircles tank 2 in a helix and exits the top side of tank 1 at a position diagonally opposite to its point of entry.

As the emission stream is blown into the centripetal fly ash/dust collector via a blower which would otherwise blow the emission stream into an industrial stack, the emission stream is forced rapidly upwards through the spiraling duct 3 and the suspended particles take a path which is tangential to that of the emission stream which is forced to follow the helixed path. The momentum of the particulates prevents their turning and they exit through the perforations in the duct 3 to be entrapped in the container 1. The inside of the container 1 is baffled as at 6 to aid fallout of the collected particulates toward the bottom of the container from whence these particles are removed by a spiraled conveyor 7 to the outside of the container for disposal. The same spiral conveyor 7 services the bottom of the second container 2 to similarly remove particles. The removed particles may or may not be considered economically valuable recoverables.

Smaller, lighter weight particles which do not settle out are suspended in the emission which escapes the duct 3 but which is trapped between the duct 3 and the wall of the container 1. This emission is drawn upward through a perforated rim 8 which joins and seals the top rim of the second container 2 with the wall of the first container 1. This portion of the emission is drawn upward through the perforated rim and downward toward the bottom of the container 2.

A pair of smaller round ducts 9 and 10 enter the top of the container 1 and penetrate the topless smaller container 2 about two-thirds its depth. These ducts 9 and 10 join together above and outside the container 1 and are serviced by a rotary pump 11. The ducts 9 and 10 draw out emission from the bottom of the container 2. The container 2 is a reservoir for emission which is stored there according to the regulating action of the rotary pump 11. The secondary emission stream from the rotary pump 11 is a regulatory stream so that the major emission stream can be regulated in mass flow volume as this major emission stream passes from centripetal fly ash collector to the cryogenic unit shown in FIG. 2.

The major emission stream exiting the duct 3 is stored in a temporary storage tank (shown in FIG. 6) interposed between the centripetal fly ash/dust collector and the cryogenic unit. The temporary storage tank may optionally contain the superconducting magnets for further particulate removal as will be discussed subsequently in conjunction with that Figure.

Figure 2:
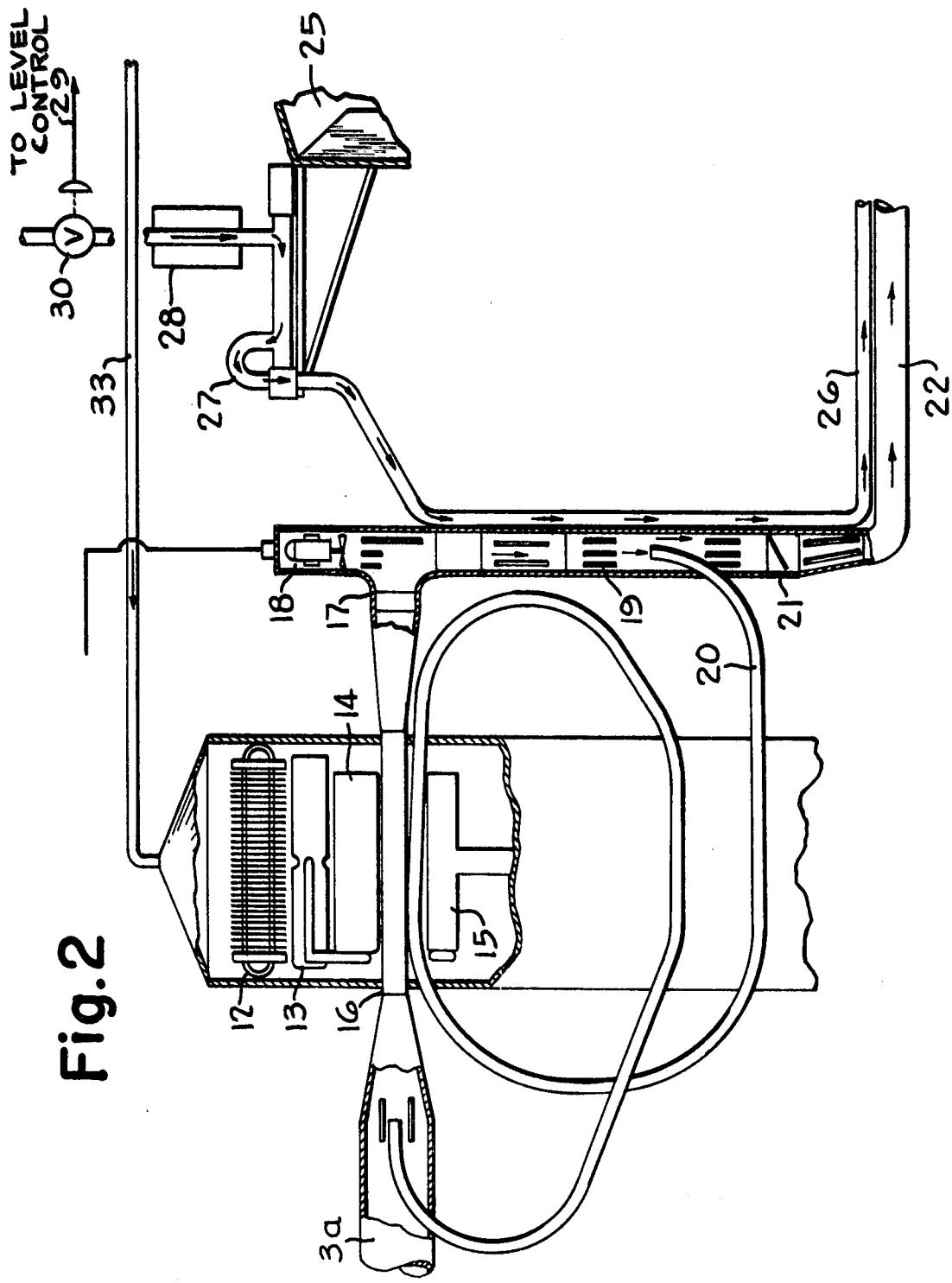
FIG. 2 shows the cryogenic unit.

FIG. 2 shows a cryogenic or refrigeration unit which operates to reduce the temperature of the emission stream from the duct 3a. This unit decreases the temperature of the emission stream substantially to reduce its volume and at the same time increase solubilities of gaseous contaminants such as $SO_2$, $CO_2$, $CO$ and others. The refrigeration unit typically includes an air cooling condenser 12, an evaporator 13, a lower, freezing, evaporator 14 and a gas heat exchanger 15.

The emission stream from duct 3a passes through a venturi 16 within the boundaries of the evaporator 13. While the emission stream is still in the venturi, its velocity is increased, thereby permitting an acceleration of temperature change. The warm incoming stream is rapidly cooled to produce a cold or chilled outgoing stream. As used in this specification, the words cryogenic cooling pertain to the use of extreme cold at the range of temperatures below −150° F.

Figure 3:
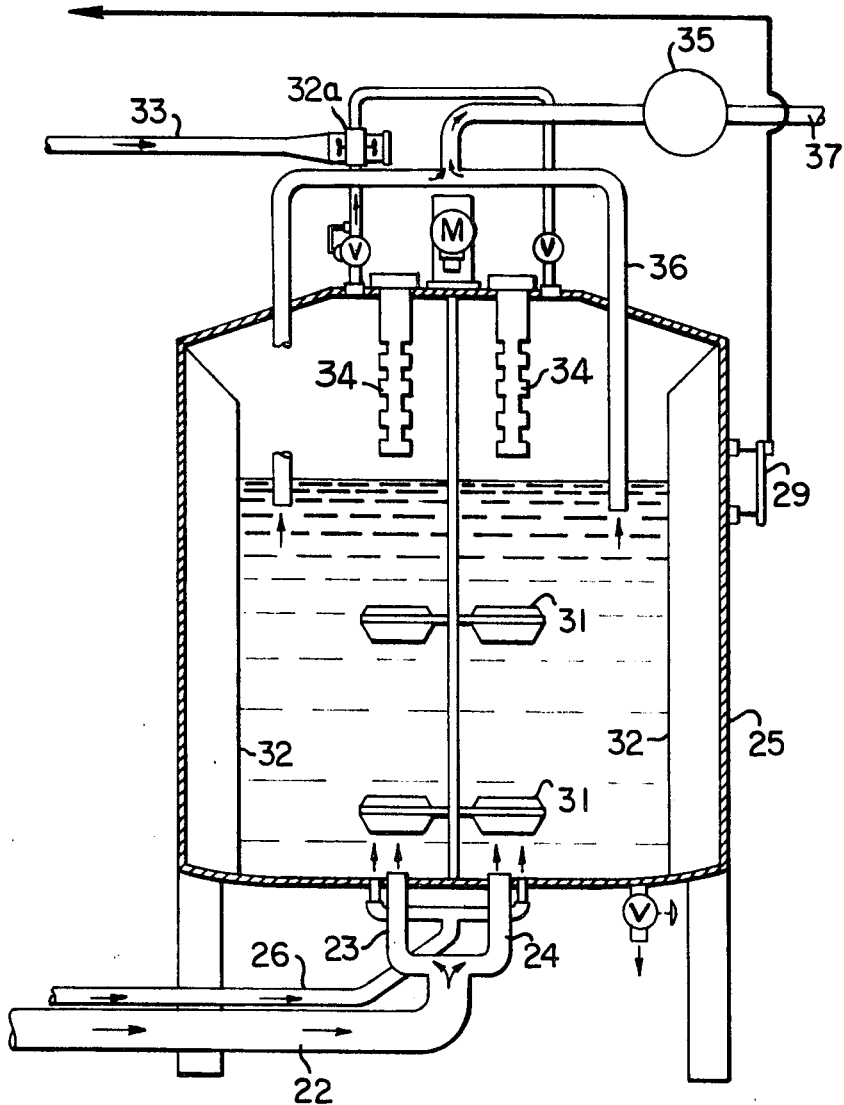
FIG. 3 shows the mix tank.

The cold air is directed through duct 17 to the mix tank shown in FIG. 3. The duct 17 is fitted with vanes 19 to direct the emission flow and is fitted with a vane axial fan 18 to accelerate the flow of the emission stream. A feedback loop of duct 20 connects the duct 17 with the duct 3a. This feedback permits cold air leaving the cryogenic unit to mix with warm air entering the cryogenic unit. The fan 18 is a variable speed fan and is controlled according to the volume flow of the emission stream entering the cryogenic unit via duct 3a. For this purpose, note the pivot device installed in duct 3a, FIG. 1.

A check valve 21 (FIG. 2) prevents back flow of water from the mix tank of FIG. 3.

In Fig. 3, the duct 22 carrying cold air from the cryogenic unit splits into two ducts 23 and 24 which enter the bottom of the mix tank 25. A water pipe 26 also is split into two branches which enter the bottom of mix tank 25 symmetrically. The duct 22 carries the chilled emission stream with its component gases such as carbon dioxide, sulfur dioxide, other contaminant gases like carbon monoxide and noncontaminant gases which typically comprise ambient air involved in combustion, said air usually being deficient in oxygen. The water pipe 26 carries cold deionized, demineralized water to dissolve the gaseous contaminants of the emission stream in water. This water is treated by applying ultraviolet energy from the ultraviolet energizer 27 (FIG. 2). The water deionizer is indicated at 28 (FIG. 2).

The treated water is used to continuously fill the mix tank 25 to a constant water level controlled by the automatic level control unit 29 which controls the solenoid valve 30 in the water input line. The low temperatures of the emission stream and the deionized, demineralized water increase the solvation and solubilities of gases in water. Very soluble gases such as $SO_2$ and moderately soluble gases such as $CO_2$ when bubbled through the deionized water mix, solvate or conjugate with water in the mix tank 25 to form electrolytes and ions. Slightly soluble gases like $N_2$ and $H_2$ will escape to the atmosphere of the mix tank 25. All gases in that atmosphere with respect to those in the water underlying that atmosphere will attempt to behave in accord with Le Chatelier's Principle. What gaseous contaminants remain in the air after it has been bubbled through the deionized water is reacted in the presence of a catalyst so that when the air leaves the subsystem shown in FIG. 3 it is now relatively pure.

The mechanical action of the two sets of impeller blades 31 and baffles 32 lining the cylindrical wall of the mix tank 25 accelerate or enhance the mixing, solvation and dissolution of these cold gases in the water. The impellers 31 mix the cold deionized deactivated water with the emission stream as shown in FIG. 3 in the presence of vanadium pentoxide catalyst rods 34 to form a dilute solution of carbonic acid, sulfurous acid, sulfuric acid, and disulfuric acid.

In the water chemical reactions take place which will remove most of the gaseous contaminants. The most common gaseous contaminants in industrial air pollution are carbon monoxide, carbon dioxide, and sulfur dioxide. All will dissolve in water to a greater or lesser extent depending on the temperature of the water, the resistivity of the water, and the temperature of the gases. There are three quantities to be considered when considering the dissolution of gases in water. The first is $\alpha$. $\alpha$ is the absorption coefficient which is the volume of gas absorbed at standard conditions for one volume of water when the partial pressure of the gas is 760 mm. of mercury. The second quantity is $q$ which is the weight of gas absorbed in grams by 100 grams of water when the total pressure is 760 mm. of mercury. The third quantity is $l$ which is the volume of gas in cubic centimeters dissolved by one volume of water when the total pressure is 760 mm. of mercury.

First consider the carbon monoxide in the emission stream. Upon dissolving in water a certain amount of the carbon monoxide dissociates to form hydronium ions, $H_3O^+$, and hydrogen carbonate ions, $HCO_3^1$. Actually, there are two reactions which go to achieve the final result. The first reaction is the water reacting with the carbon monoxide to form carbonic acid.

Carbonic acid is a diprotic compound. Thus when it dissociates it can form two ions. One dissociation produces the normal carbonate ion, $CO_3^-$

The other dissociation produces the hydrogen carbonate ion, $HCO_3^1$.

For carbon monoxide the value of $\alpha$ is 0.03537 at 0° C. and $Q$ is 0.004397 also at 0° C. Carbon dioxide acts in the same way chemically only much more so because it dissociates much more easily.

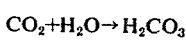

$H_2CO_3 \rightarrow H_3O^+ + CO_3^-$ $0^+ + CO_3$ The absorption constants for carbon dioxide are $\alpha$=1.713 and $q$=0.33460. Relatively speaking, carbon dioxide is much more soluble than carbon monoxide. One liter of water will dissolve 1713 milliters of carbon dioxide at standard conditions whereas it will dissolve only 35.4 milliters of carbon monoxide at standard conditions.

The other contaminant in the emission stream is sulfur dioxide. There is a complex of reactions which sulfur dioxide undergoes in the subsystem shown in FIG. 3. An amount of sulfur dioxide will dissolve in the water depending on the temperature of the emission stream and the temperature of the water. The solubility constants of sulfur dioxide are $l$=79.789 and $Q$=22.83 at standard conditions. A certain amount of the sulfur dioxide dissolved in the water will react to form sulfurous acid.

$$H_2O + SO_2 \rightarrow H_2SO_3$$

Sulfurous acid dissociates to form hydronium ions, $H_3O^+$, and sulfite ions, $SO_3^{1+}$.

$$H_2SO_3 \rightarrow H_3O^+ + SO_3^-$$

What sulfur dioxide that is not dissolved in the water passes into the air at the top of the mix tank. At the top of the mix tank are vanadium pentoxide catalyst rods. In the presence of these catalyst rods the sulfur dioxide and oxygen react to form sulfur trioxide.

$$SO_2 + O_2 \rightarrow SO_3$$

The sulfur trioxide will then react with the water to form sulfuric acid.

$$SO_3 H_2O \rightarrow H_2SO_4$$

Sulfuric acid is a strong acid which dissociates in water to form hydronium ions, $H_3O^+$, and sulfate ions $SO_4^{1+}$.

$$H_2SO_4 \rightarrow H_3O^+ + SO_4^1$$

As more sulfur trioxide dissolves in the water creating a mild sulfuric acid solution, another reaction takes place to a much lesser extent. Now the sulfur trioxide can also react with the mild sulfuric acid solution to form disulfuric acid.

$$SO_3 + H_2SO_4 \rightarrow H_2S_2O_7$$

Thus the air is finally cleansed and the water is now a mild solution of carbonic acid, sulfurous acid, sulfuric acid, and disulfuric acid.

The cleansed air is now used as part of the cooling system in the subsystem shown in FIG. 2. The mild acidic solution is also used as part of the electrolyte in the subsystem shown in FIG. 5 to facilitate the oxidation of the dissolved organic contaminants.

Excepting the centripetal fly ash/dust collector of FIG. 1, all other subsystems are housed in an air conditioned room to enhance the operation of the equipment. A pressure buildup in the atmosphere of the mix tank 25 can be used to drive an induction fan 32a (made of lightweight plastic) to induce conditioned room air into a duct 33 that services the hood of the air cooling condenser 12 of the cryogenic unit in FIG. 2. An electric motor drives the shaft which contains the two sets of impellers 31, one of which is positioned near the bottom of the mix tank 25 extremely close to the incoming emission stream, while the other of these is positioned toward the upper half of the tank 25. A rotary pump 35 which is automatically regulated and controlled by the level control unit 29 for the mix tank 25 is positioned above the mix tank 25 and so mounted to pump out the water of the mix tank 25 via a set of pipes 36. These penetrate the tank 25 to a calculated depth below the water level in the tank 25. The pumped water line 37 services the centrifuge of FIG. 4.

Figure 4:
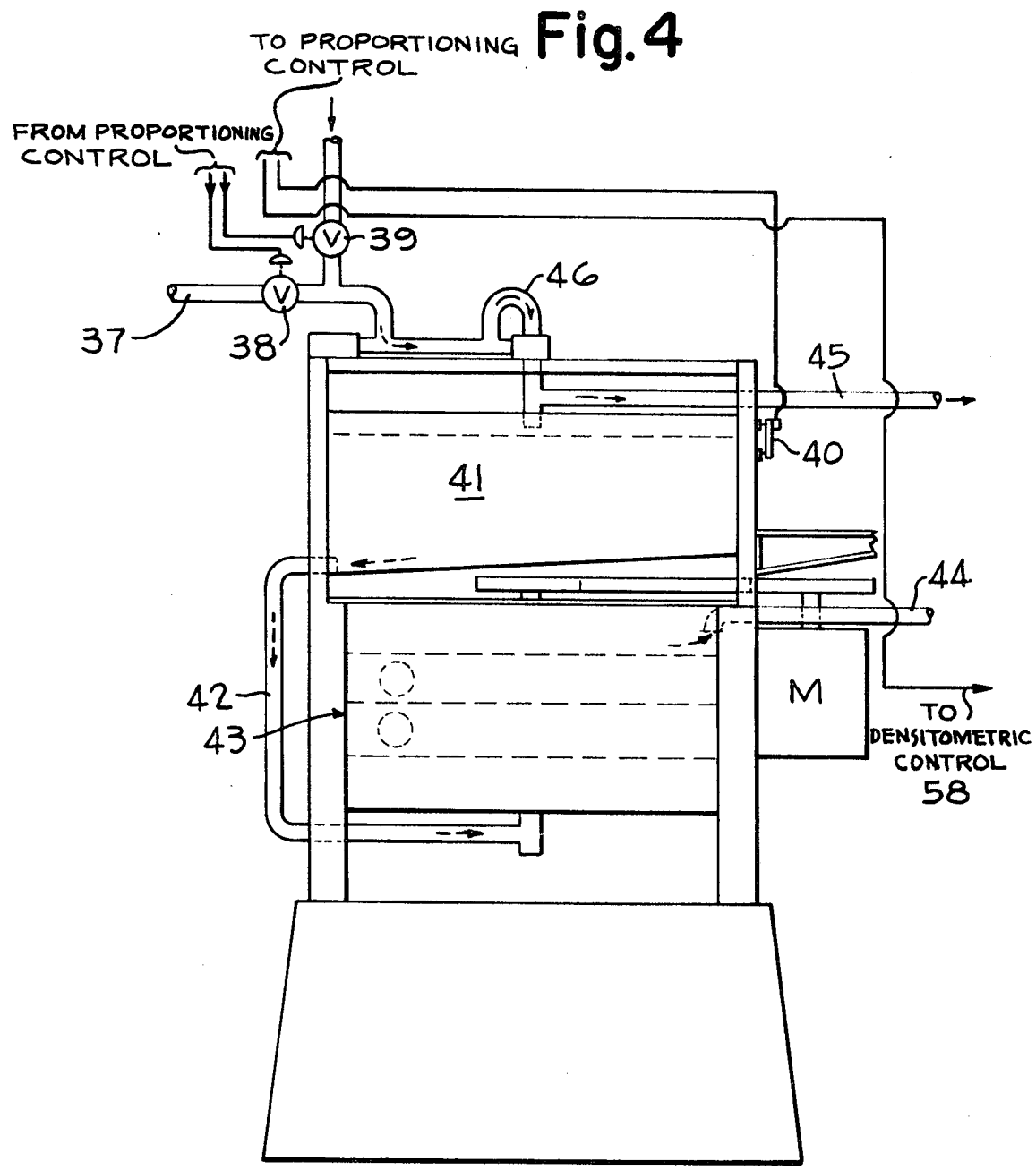
FIG. 4 shows the centrifuge.

In FIG. 4 there is shown a centrifuge and holding tank which receives the effluent from the mix tank of FIG. 3 and water containing waste matter (for example, sanitary waste) in controlled proportions. The effluent from the mix tank, and which will be used as an electrolyte source, is supplied through solenoid valve 38. Secondary sanitary waste is supplied through solenoid valve 39. Both solenoid valves 38 and 39 are controlled in accordance with electrical signals from the level control unit 40 and from the densitometric unit in FIG. 5 to provide a constant level of liquid in the centrifuge holding tank 41 and to provide a mixture to the electrochemical system of FIG. 5 which is relatively low in suspended solids. The liquid in the holding tank 41 has appreciable dissolved or soluble solids and/or colloidal organic and/or inorganic loading and may also have an inappreciable suspended solids loading. The liquid in the holding tank 41 is conveyed through pipe 42 to the bottom feed of a centrifuge 43.

Immiscible chemicals are separated physically by centrifugation and their fractions removed and piped away at this point. Miscible chemicals including the water fraction are piped through pipe 44 to the electrochemical processing unit of FIG. 5.

Figure 5:
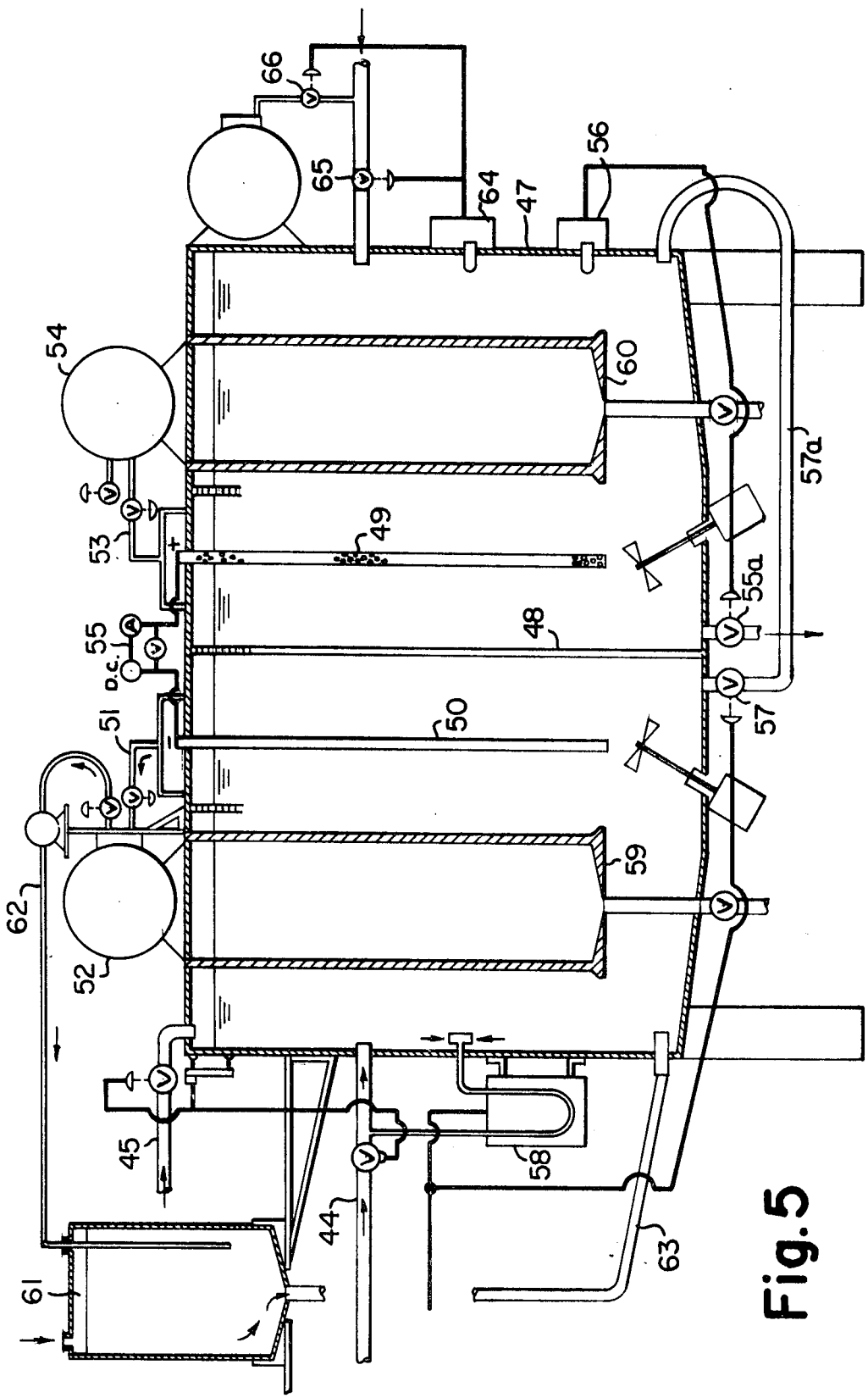
FIG. 5 shows the electrochemical galvanic processing unit.

The effluent having controlled ratio of organic matter to electrolyte source is also piped directly to the electrochemical processing unit through pipe 45. An ultraviolet energizer 46 fuses chemicals in the effluent to prepare them for use in the electrochemical processing unit. The ultraviolet energizer 46 changes the state of the chemicals including those such as desoxyribonucleic acid of living micro-organisms, thereby deactivating living matter either directly or indirectly by producing chemicals, for example such as chlorine via photochemical decomposition, which adversely affects microbes. The effluent discharged to the electrochemical processing unit of FIG. 5 is nonliving with appreciable quantities of inorganic and organic matter. Organic matter present in the form of fixed oils as dissolved solids when mixed in the centrifuge holding tank 41 with the dilute solution of acids produced in mix tank 25 can be saponified or hydrolized, then removed by centrifugation or electrochemical oxidation (loss of electrons).

The subsystem shown in FIG. 5 is an electrochemical processing unit contained in a closed cylindrical tank 47. A permeable membrane 48 separates the tank into two sections.

The first section of the tank 47 contains a metallic anode 49 which may be constructed of aluminum or zinc, for example. The second section of the tank contains a metallic cathode 50 which may be constructed of nickel or copper-nickel alloy, for example. Anode 49 and cathode 50 may e constructed of solid reactive metals as listed in the galvanic series, or may be constructed otherwise; for example, the anode may be an inert material plated with a reactive metal like zinc and the cathode may be specially fabricated as a porous electrode like nickel which permits gas, liquid or solid reactant to be forced through the pores of the cathode. The choice of electrodes and use of available electrolytes will depend upon performance criteria as energy efficiency (% energy out/energy in), energy and power density requirements.

The permeable membrane 48 has a porosity which permits the passage of inorganic cations toward the anode 49 and permits the passage of inorganic anions toward the cathode 50. The membrane is permeable to these relatively small mass inorganic ions but is impermeable to the relatively large mass organic compounds. The membrane 48 may be constructed of micro-porous hard rubber or polyurethane.

At the cathode 50 chemical reduction takes place which produces $CO_2$, $O_2$ and $N_2$ which arise along the cathode 50 to be removed through the vent 51 to the collecting sphere 52.

At the anode 49 chemical oxidation occurs to produce hydrogen which is similarly collected through vent 53 and collected in the hydrogen sphere 54.

A source of voltage, indicated at 55, is applied to the electrodes. Oxidation and reduction in electrochemical systems is described in "Introduction to Electrochemistry," Glasstone, D. Van Nostrand CO., Inc., 1942, Chapter 8, and particularly pages 291-299 which describe reversible oxidation-reduction processes involving certain organic compounds.

Organic matter in the first section of the tank is oxidized electrochemically in the region surrounding the anode 49. When the organic compounds in the first section have been oxidized to the desired degree, the effluent is discharged through the valve 55a. In FIG. 5 this valve has been shown to be automatically controlled to open only when the desired oxidation has taken place as indicated by the conductivity measuring unit 56. The conductivity of the electrolyte in the first section of the tank is a measure of the ability of ions in the solution to carry an electric current. The level of conductivity of the electrolyte can be used to control the valve 55a to open it when the desired level of oxidation of organic matter has taken place.

Unoxidized organic matter is transferred from the second section to the first section through valve 57 and pipe 57a. The transfer of unoxidized organic matter from the second section to the first section has been shown as automatically controlled in response to the density of the effluent in the second section of the tank. When the second section is too dense with unoxidized organic matter, the density control unit 58 opens the valve 57 to allow unoxidized organics to pass from the second section to the first section.

Electrochemical systems have previously been used to oxidize organic matter, however, they have been difficult to control. There is a tendency for all of the cations to very quickly migrate to the vicinity of the anode 49 and for all of the anions to very quickly migrate to the vicinity of cathode 50. The permeable membrane 48 slows down this migration somewhat. Nevertheless, even with the membrane 48 in place, the electrochemical cell will become discharged with all of the cations in the first section and all of the anions in the second section.

In order to recharge the cell, two chargeable organic electrodes 59 and 60 are provided. As was previously stated, the primary purpose of the electrochemical cell is the oxidation of dissolved organic waste. This purpose is accomplished by the selective migration of ions. This is accomplished by the use of organic polyelectrodes. These electrodes have the capability of being charged both positively and negatively depending on the charging voltage. Thus, if one electrode is positively charged and the other is negatively charged, the negative ions will migrate across the membrane toward the positively charged electrodes. The ionic flow can be reversed by reversing the charge on the polyelectrodes. Both chargeable organic electrodes 59 and 60 are cylindrical containers constructed of a permeable membrane. The membrane is impermeable to organics of high molecular weight. The membrane may be a polyvinyl chloride membrane which is approximately 4 mills thick and which has holes which are .001 to 0.1 microns in diameter. The fabrication of such a membrane is within the skill of the art. Such a membrane is described, for example, in "Sea Water Conversion By Reverse Osmosis," a publication of Havens Industries, 8133 Arrow Drive, San Diego, California 92123. The permeable membranes of the electrodes 59 and 60 permit the flow of ions such as $H^+$, $Na^+$, $K^+$, $H_3O^+$, $CO_3^-$, $HCO_3^1$, $Cl^+$, also the flow of relatively small molecules such as $H_2O$, $O_2$ and $CO_2$. The membranes prohibit the diffusion of the larger polyelectrolyte ions or organic ions such as proteins like hemoglobin, $HB^1$, $HBO_2{}^1$, $HBNHCOO^1$.

The membranes 59 and 60 are charged with polyelectrolyte. The polyelectrolyte contains long carbon chain molecules such as an aromatic aliphatic or an aliphatic aromatic. The long complex carbon-to-carbon chains of proteins like gelatins are zwitter ions. That is, they can be either cations or anions, depending upon the pH of the electrolyte; proteins combine with both acids and bases and are usually amorphous and colloidal. Because of diffusion of the effluent between the first and second sections of the electrochemical cell, and, because the effluent is a dilute solution of acids, the pH will be acidic, that is, less than pH 7.00 in both sections of the tank 47. At a given pH, which will be controlled within critical limits for a given isoelectric point if the polyelectrolytes are proteins, the organic electrode 59 will act as a cation whereas the organic electrode 60 will act as an anion. That is, the organic electrodes 59 and 60 can be charged with different polyelectrolytes, meaning that for a given pH organic electrode 59 can be selectively made to act cationic, whereas for the same pH organic electrode 60 can be selectively made to act anionic.

Figure 7:
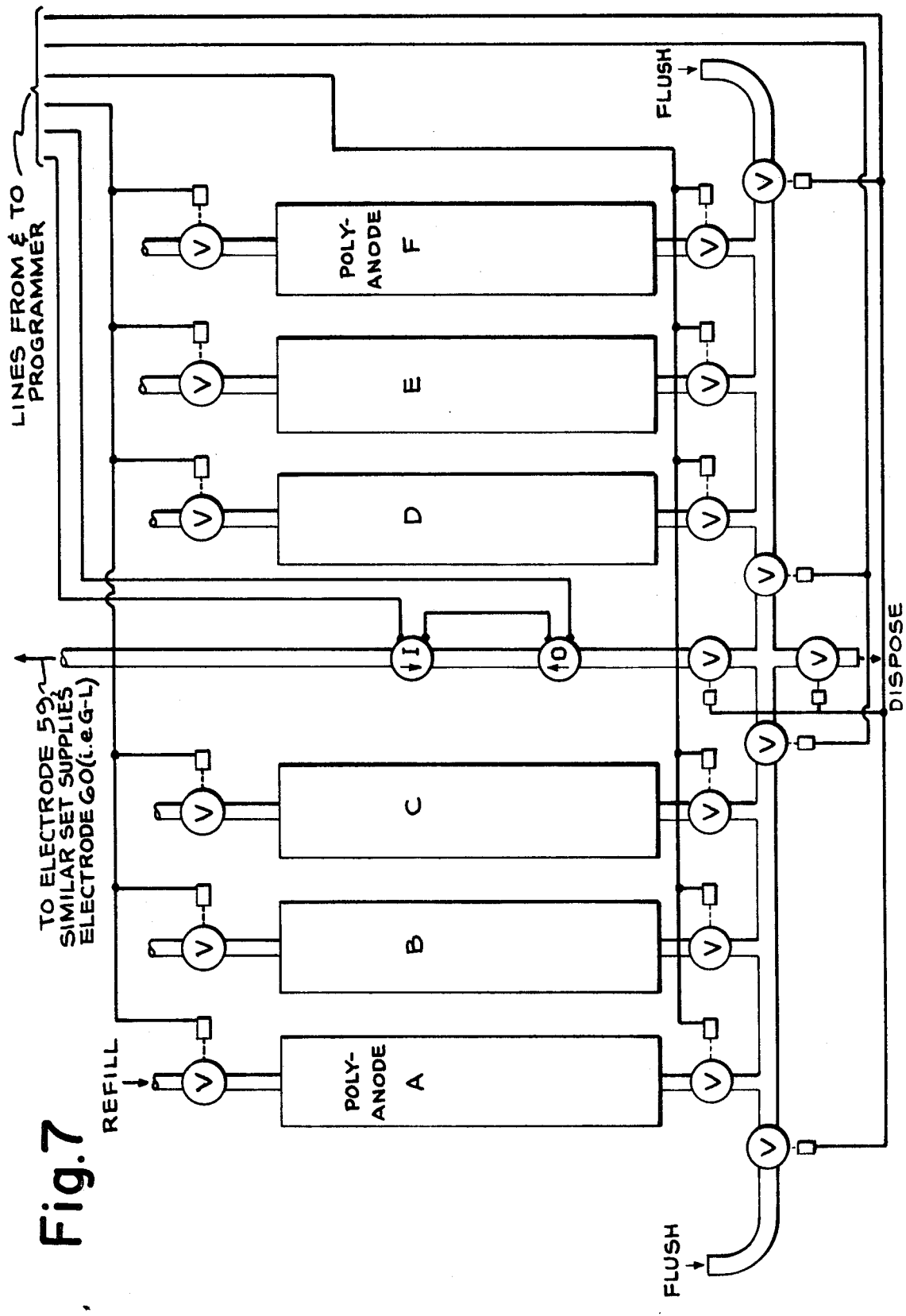
FIG. 7 shows polyelectrode material reservoirs.

In FIG. 7 is shown a group of six anionic cylinders connected to a common manifold which serve the first section's polyelectrode 60. A separate group of six cationic cylinders are similarly connected to serve the second section's polyelectrode 59. Thus, for a given pH maintained in tank 47, one can select and charge the chargeable organic electrodes as one chooses to affect the desired migration of ions either way across membrane 48.

Assuming that the polyelectrolyte is proteinaceous, then the reaction in electrode 60 is:

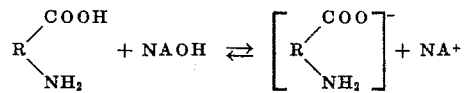

In the above, the $R \cdot NH_2 \cdot COOH$ which is a complex molecule is a protein, described above as a polyelectrolyte; the reaction described takes place when the pH is such that the protein is an anion. In the reaction, $Na^+$ is a cation.

Assuming that the polyelectrolyte is proteinaceous, then the reaction in electrode 59 is:

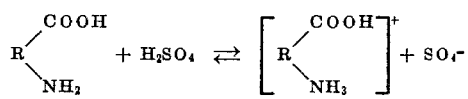

In the above, the $R \cdot NH_2 \cdot COOH$ which is a complex molecule is a protein; again, the reaction described takes place when the pH is such that the protein molecule is a cation. In the reaction, $SO_4$ is an anion. The result of the foregoing reactions is that cations diffuse through the membrane of electrode 59 and are available in solution outside of the electrode 59. Similarly, anions diffuse through the membrane of electrode 60 and are available in the solution outside of that electrode.

By charging and recharging the organic electrodes 59 and 60 the migration and concentration of inorganic and organic ions can be carefully controlled. This is the unique feature of using organic electrodes 59 and 60 in conjunction with the metallic electrodes.

In order to assure an adequate supply of sodium hydroxide for the above reactions, a sodium sulfate cycler 61 is provided. Carbon dioxide from the sphere 52 is conveyed through pipe 62 to the sodium sulfate cycler 61 where it is mixed with sodium salts ($\eta NaX$) and water to form sodium carbonate, water and sodium hydroxide. These are conveyed through pipe 63 to the second section of the tank 47. The sodium carbonate and sodium hydroxide react with the sulfuric acid which is in the electrolyte source as follows:

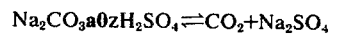

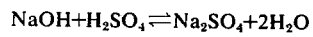

A pH meter 64 is provided to monitor the pH of the solution in the tank 47. The output of the pH meter 64 can be used to automatically control solenoid valves 65 and 66 which respectively control the flow of water and concentrated electrolyte to maintain the pH of the solution in tank 47 within the desired limits to optimize the reactions involving proteins as described above.

MODIFICATION OF THE INVENTION

Figure 6:
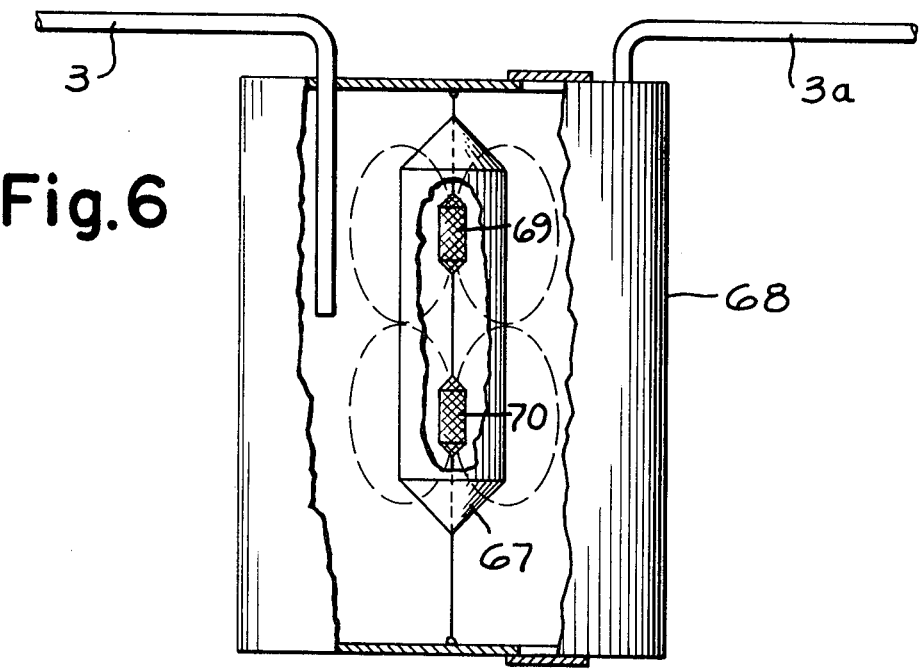
FIG. 6 shows the storage tank superconducting magnets.

Referring now to FIG. 6, there is shown a magnetic precipitator. While the magnetic precipitator has been shown as included in a separate reservoir between the fly ash/dust collector and the cryogenic cooling unit, it will be understood that the precipitator may be included at other points in the system. For example, the precipitator could most advantageously be positioned within the inner container 2 in the fly ash collector.

As shown in FIG. 6, a plastic cylinder 67 is oriented longitudinally within the reservoir tank 68. The emission from the fly ash collector of FIG. 1 enters the tank 68 through the duct 3 and the cleansed emission emerges and is conveyed to the cryogenic unit through duct 3a.

Two superconducting magnets 69 and 70 are suspended within nylon nets which in turn are suspended by nylon cord attached to either end of the plastic cylinder 67. The magnets are supplied with low voltage current and produce an extremely dense magnetic field in the order of 30,000 gausses each. A description on superconducting magnets can be found in "Cryogenic Systems," Barron, Randall, pages 10, 559, McGraw-Hill Book Company, 1966.

Colloidal or suspended particulates moving through this field are magnetized and the particulates are precipitated. The advantages of this type of precipitation are: simplified design; more efficient and effective precipitation compared to electrostatic precipitation; low voltage current is required; and, the gases in the emission stream are not affected, that is, they are not ionized, for example.

The placement of the superconducting magnets 69 and 70 in a separate tank 68 which is serviced by the subsystem of FIG. 1, and which services the subsystem of FIG. 2, is very important and takes into account thermal effects and positioning of magnetic filed.

Brownian movement accounts for molecular motion of the particles, their random movement in all directions. Cold reduces Brownian movement, heat increases Brownian movement so that Brownian movement is tied to thermal motion or kinetic energy. If flue gas contaminated with charged particles is moving into the separate tank which contains the superconducting magnets, then heat will increase the random motion of the particles. At the same time the Perrin effect will find particles above pushing and crowding particles below so that near the bottom of the atmosphere of tank 68 the density is greatest. The input to the tank should ideally be midway to the top of the tank although it is shown slightly below midway in FIG. 6.

The superconducting magnets 69 and 70 are so positioned that their magnetic fields run straight out across the path of the moving charged particles. The charged particles will be deflected at right angles to the path and to the magnetic field; if the magnetic field is reversed the path is deflected the opposite way. Accordingly, the suspension of the particles can be regulated; the particles can be deflected to the bottom of the tank. Hence the output from the tank should also be midway to the top of the tank. Between the superconducting magnets and the output, also aligned vertically, should be a deflection net of nonmagnetic material.

Figure 6A:
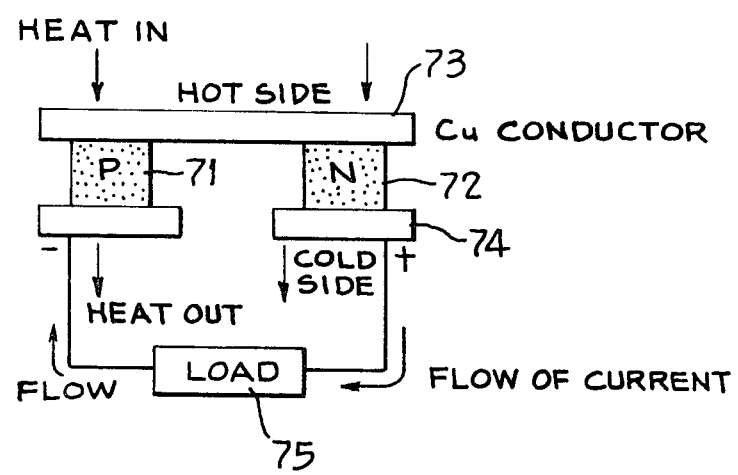
FIG. 6a shows the generation of electricity from P and N-type material.

While the superconducting magnets as shown in FIG. 6 can be supplied from any low voltage source, advantage can be taken of the thermal properties of certain components of the system to generate a low voltage current by thermoelectric effects. For example, the container 2 in FIG. 1 may be used for thermoelectric generation of low voltage by taking advantage of the fact that the outside of the container is hot and the inside of the container is at a cooler temperature. There is a flow of heat from outside to inside of the container. By positioning P-type and N-type semiconductor wafers in alternate layers around the periphery of this container as shown in FIG. 6a, a low voltage may be generated. While only the two pieces of material 71 and 72 have been shown in FIG. 6a, it will be understood that there will be a number of pieces of this material positioned around the entire periphery of the container which is indicated to be 73 in FIG. 6a. Heat flow between the hot side 73 and the cold side 74 will generate a low voltage across an appropriate load indicated at 75.

The system has been shown in FIGS. 1-6 in linear perspective. The system can equally well be constructed in circular perspective and the subsystems can be cascaded to conserve space and to increase capacity. While six different subsystems have been shown in the principle embodiment, multiples of each subsystem can be used as required in particular circumstances.

While a particular embodiment of the invention has been shown and described, it will, of course, be understood that various modifications may be made without departing from the principles of the invention. The appended claims are, therefore, intended to cover any such modification within the true spirit and scope of the invention.

What is claimed is:

1. The method of depolluting an emission gas containing oxides of sulfur and of carbon and depolluting waste water containing oxidizing matter comprising:
   cryogenically cooling said emission gas to reduce its volume and increase the solubility of the component gases,
   deactivating living matter cold deionized water,
   reacting the cold deionized deactivated water with said emission gas in the presence of a contact catalyst and air, all to form a diluting electrolyte solution of carbonic acid, sulfurous acid, sulfuric acid, and disulfuric acid and mixing said electrolyte with said waste water in controlled porportions so that the ratio of waste matter to electrolyte is constant, and
   electrochemically oxidizing said matter in an electrochemical cell to produce relatively clean effluent ready for reuse.

2. The method of depolluting an emission gas containing oxides of sulfur and carbon and waste waters containing oxidizable matter comprising:
   precipitating particulate matter from said emission gas to produce a generally cleansed emission gas containing only component gases,
   reacting the cleansed emission gas with cold deionized water to dissolve and dilute said component gases, particularly the oxides of sulfur and of carbon, to produce an electrolyte source having desired concentrations for electrochemical use,
   mixing said electrolyte source with said waste waters in controlled proportions so that the ratio of waste matter to electrolyte source is substantially constant, and
   electrochemically oxidizing said matter to produce a relatively clean effluent ready for reuse.

3. The method recited in claim 2 wherein the step of electrochemically oxidizing is carried out in a container separated into first and second sections by a permeable membrane having a porosity permitting the passage of inorganic cations and anions, said step comprising:
   selectively charging an organic electrode in said first section with anionic polyelectrolyte,
   selectively charging an organic electrode in said second section with cationic polyelectrolyte, and
   controlling the migration and concentration of inorganic and organic ions by the charging and recharging of said organic electrodes as necessary to bring about electrolytic action which reverses the electrochemical cell reaction to charge the said anode and the said cathode.

4. The method recited in claim 2 further comprising:
   cryogenically cooling said emission to reduce its volume and increase the solubilities of said component emission gases.

5. The method recited in claim 2 further comprising:
   applying ultraviolet radiation to said deionized water prior to reacting to deactivate living matter.

6. The method recited in claim 2 wherein said step of reacting cold deionized water with said emission is carried out in the presence of a contact catalyst to form a dilute solution of carbonic acid, sulfuric acid, and disulfuric acid.

7. The method recited in claim 2 wherein the step of precipitating particulate matter comprises:
   blowing said emission gas into the bottom of a vertically, ascending, spiraling duct perforated semicircumferentially so that said particulates, together with a portion of said emission, exit said duct through the perforations.

8. The method recited in claim 2 wherein the step of precipitating particulate matter comprises blowing said emission gas into a container having two superconducting magnets oriented longitudinally within said container so that their fields of disturbance are most effectively exposed to said radiation, and
   applying a relatively low voltage electric current to said magnet to produce a dense magnetic field so that suspended particulates moving through this field will be magnetized and said particulates will precipitate.